United States Patent Office 3,307,474
Patented Mar. 7, 1967

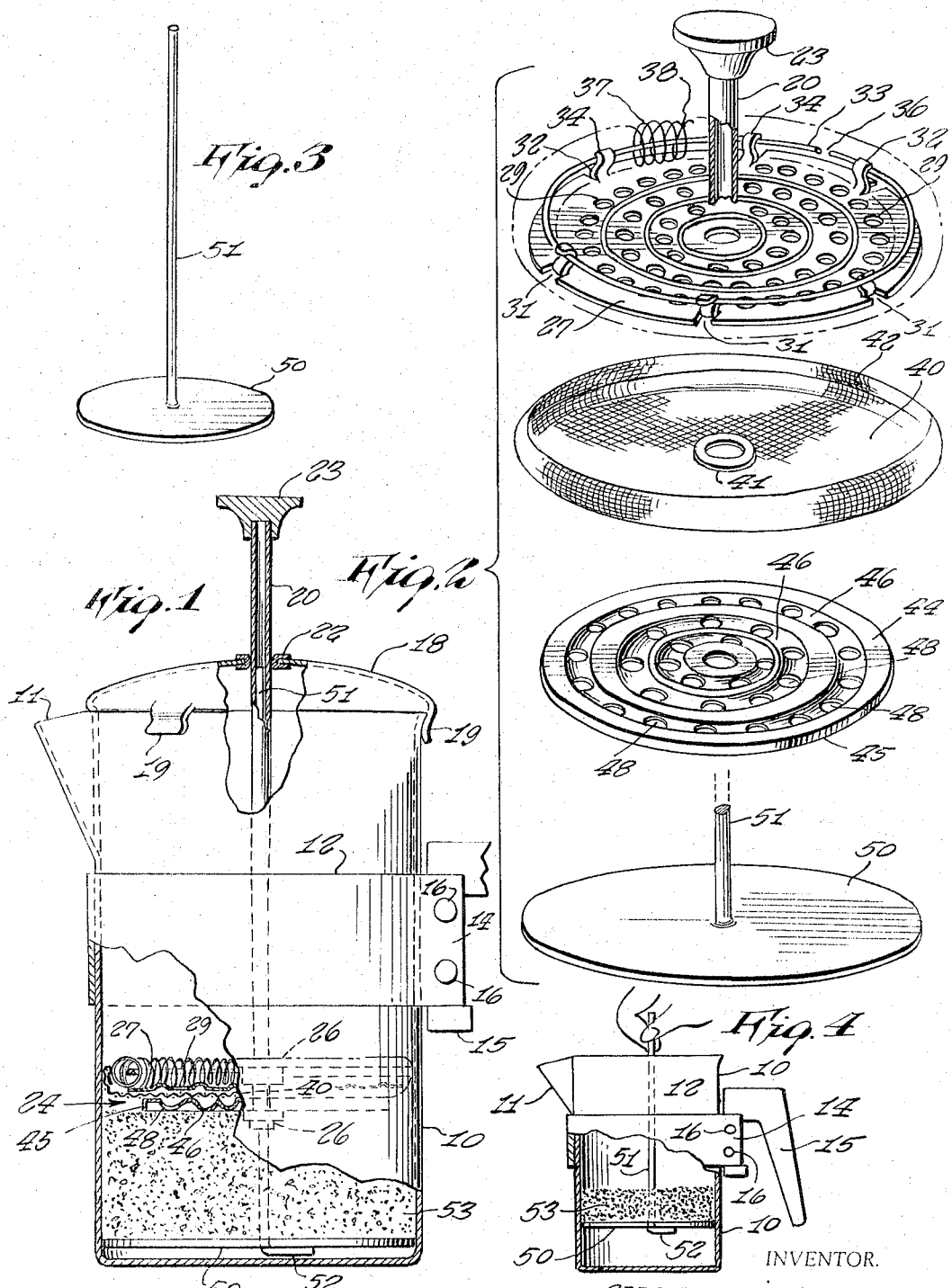

3,307,474
COFFEE BREWING APPARATUS WITH MEANS FOR REMOVING USED COFFEE GROUNDS
Charles Kasher, New York, N.Y., assignor, by mesne assignments, to Boonton Molding Company, Inc., Boonton, N.J., a corporation of New Jersey
Filed Apr. 14, 1965, Ser. No. 448,126
5 Claims. (Cl. 99—287)

The present invention relates to coffee brewing apparatus of the type wherein the coffee grounds, which are mixed with hot water, are forced to the bottom of the brewing vessel by means of a filter member. More particularly, the invention pertains to means for removing the spent coffee grounds from the bottom of the vessel after the brewed coffee has been poured.

The brewing apparatus comprises a cylindrical vessel, usually a beaker formed of heat resistant glass and having a pouring lip. The vessel is provided with a handle. Means including a tubular push rod are provided for pressing a filter member downwardly to the bottom of the vessel through a mixture of coffee grounds and hot water after the brewing of the coffee has been completed. Preferably, the filter member comprises a wire cloth filter element which is laterally spring pressed against the inner wall surface of the vessel to prevent the passage of coffee grounds upwardly past the periphery of the filter as the filter member is manually moved downwardly through the mixture.

The removal member of the present invention comprises a circular disc which is placed at the bottom of the vessel. A lifting rod extends upwardly from the center of the disc and is received within the tubular push rod. With the filter member removed, the lifting rod projects above the top of the brewing vessel permitting it to be conveniently grasped for positioning or removal of the circular disc upon which the spent coffee grounds are received.

The invention is described in greater detail in the following specification with reference to the accompanying drawing forming a part hereof.

Referring to the drawing:

FIGURE 1 is a side elevational view of a coffee brewing apparatus embodying the invention, the view being partly broken away and shown in section to illustrate details of construction.

FIGURE 2 is an exploded perspective view of the filter unit and the removal member.

FIGURE 3 is a perspective view, on a reduced scale, of the removal member.

FIGURE 4 is a side elevational view, on a reduced scale, broken away to illustrate the operation of the removal member with the filter unit removed.

Referring to the drawing, the coffee maker comprises a cylindrical beaker 1 provided with a pouring lip 11. The beaker 1 is partially encircled by a metal strip 12. The ends 14 of the strip 12 extend outwardly from the beaker 10 in spaced parallel relationship and a handle 15 is secured between the ends 14 by bolts 16.

A cover member 18 is removably disposed on top of the beaker 10. The cover member 18 is provided with three equally angularly spaced integrally formed depending leg portions 19. The legs 19 are suitably shaped to serve as retaining members for holding the cover member 18 securely positioned on top of the beaker 10 and yet are sufficiently resilient to permit the cover member 18 to be removed or replaced at will.

A hollow tubular push rod 20 is freely slidable through a circular grommet 22 centrally located in the top of cover member 18. The upper end of the push rod 20 carries a knob or handle 23 which is grasped by the hand of a user for producing vertical displacement of the push rod 20. At its lower end, the push rod 20 carries a filter unit designated generally as 24 secured between knurled nuts 26 threaded on the push rod 20. The lower nut 26 is hand tightened so that it may be readily loosened without the use of tools to permit removal and disassembly of the filter unit 24 for cleaning.

The filter unit 24 comprises a generally circular upper plate 27 which has a series of concentric annular stiffening ridges 28 formed therein. Intermediate the ridges 28 are through apertures 29 arranged in concentric circular rows. At the periphery of the plate 27, a regularly spaced series of rectangular notches 31 is formed providing integrally formed upwardly and outwardly extending support fingers 32. A wire guide ring 33 is spot-welded to the free ends of the fingers 32 immediately below a short horizontally extending terminal portion 34 of each finger 32. There is a gap 36 between the ends of the wire which forms the guide ring 33. The guide ring 33 is surrounded throughout its length by a toroidally shaped endless helical compression spring 37. The ends of the toroidal spring 37 are spliced by spot-welding at 38 so that the toroidal spring is uniformly flexible substantially throughout its entire length. The gap 36 permits the guide ring 33 to be inserted in the endless toroidal spring 37 after completion of the spot-welding at 38 but prior to spot-welding to the fingers at 34.

The maximum diameter of the toroidal springs 37, when it is freed except from the guide ring 33, is greater than the internal diameter of the beaker 10. A small radial inward movement of the toroidal spring 37 is thus required in order to fit the filter unit 24 into the beaker 10 and this movement involves a reduction in the circumference of toroidal spring 37 which compresses the spring 37. Within the limits of movement permitted by the guide ring 33, the toroidal spring 37 operates substantially as if it were free and unsupported. This causes the toroidal spring 37 to provide a positive yet resiliently yielding guiding action for the filter unit 24 as it is inserted in the mouth of and moved downwardly within the beaker 10.

Below the upper plate 27 there is a filter element 40 formed of stainless steel wire cloth of suitable mesh to prevent the passage therethrough of coffee grounds. A stainless steel grommet 41 is fixed centrally in the filter element 40 and passes freely slidably over the push rod 20. At its outer edge 42, the wire cloth is doubly folded over and pressed together so that the ends of the wires which form the rough edge 42 are sandwiched between two layers of the wire cloth and guarded by the fold joining the two layers. The outer peripheral portion of the filter element 40 is upwardly turned for engagement by the toroidal spring 37 which yieldingly presses the peripheral portion of the filter element 40 into lateral engagement with the inner surface of the beaker 10.

A circular lower plate 44 is positioned on the push rod 20 beneath the filter element 40. The lower plate 44 has a downwardly turned lip 45. A series of concentric ridges 46 are formed in the lower plate 44. Apertures 48 are formed in the crests of the ridges 46 for communication with the flat annular zone of filter element 40 which is situated above the annular space located above and defined by each ridge 46. By forming the apertures 48 of the lower plate 44 in the crests of the ridges 46, relative angular adjustment of the upper and lower plate members to obtain registration between the apertures 29 of the upper plate 27 and apertures 48 of the lower plate 44 is unnecessary.

The removal member comprises a circular disc 50 to which is rigidly secured an upright lifting rod 51. The lifting rod 51 extends upwardly from the center of the disc 50. Conveniently, the lower end of the lifting rod 51 may be bent to extend horizontally below the disc 50 as indicated at 52 so that it operates as a spacer which maintains the disc 51 positioned slightly above the bottom of the beaker 10. When the filter unit 24 is positioned within the beaker 10, the lifting rod 51 is axially received within the tubular push rod 20.

With the disc 50 in its lowermost position, as shown in FIG. 2, the upper end of the lifting rod 51 extends above the top of the beaker 10 so that it may be conveniently grasped for positioning or removal of the disc 50 as shown in FIG. 4.

In operation, the disc 50 is first positioned at the bottom of the beaker 10, the beaker 10 then being empty. A suitable quantity of finely ground coffee 53 is then placed on top of the disc 50. Boiling or almost boiling water is added and the mixture of coffee grounds and hot water is stirred for a suitable period (about thirty seconds). The hollow push rod 20 is manipulated to receive the upper end of the lifting rod 51 and the cover 18 is positioned on top of the beaker 10, the push rod 20 then being fully extended above the cover 18. The filter unit 24 is then pushed slowly downwardly within the beaker 10 by the manual application of pressure while grasping the knob 23. When the filter unit 24 reaches its lowermost position above the disc 50, the spent coffee grounds 53 are packed between the disc 50 and the filter unit 24 and the interior of the beaker 10 above the filter unit 24 is filled with fresh clear coffee. The freshly brewed coffee may be poured through the lip 11 without removing the cover 18 or raising the filter unit 24. After the clear coffee has been consumed, the filter unit 24 may be removed and disassembled for cleaning.

The spent coffee grounds 53 which are packed on top of the disc 50 may be removed as a unit by grasping the lifting rod 51 and raising the disc 50. FIG. 4 shows the spent grounds 53 partially raised to the top of the beaker 10. The small quantity of coffee grounds which passes around the edge of the disc 50 is loose rather than firmly packed and may be readily removed by rinsing. The packed body of grounds 53 on top of the disc 50 may be conveniently lifted out of the beaker 10 and discarded into a suitable refuse receptacle.

While I have shown and described what I believe to be the best embodiments of my invention, it will be apparent to those skilled in the art that various changes and modifications may be made therein without departing from the spirit and scope of the invention as defined in the appended claims.

What is claimed is:

1. Coffee brewing apparatus comprising: a cylindrical vessel open at its top; a freely vertically displaceable disc member positionable within said vessel to extend across and substantially completely cover the bottom thereof; lifting rod means connected to said disc member and extending upwardly therefrom at least to the top of said vessel when said disc member is positioned at the bottom thereof; filter means vertically slidably engageable with the inner wall surface of said vessel, said filter means being freely longitudinally slidable with respect to said rod means and extending completely across the interior of said vessel for forcing downwardly all of the grounds of a mixture of coffee grounds and hot water within said vessel to provide clear brewed coffee above said filter means; and handle means vertically movable independently of said lifting rod means, said handle means being connected to said filter means for vertical displacement thereof, said handle means being positioned above the top of said vessel with said filter means in its lowermost position, said grounds being confined between said filter means and said disc when said filter means is in said lowermost position.

2. Coffee brewing apparatus according to claim 1, wherein said handle means comprises a handle member and a hollow tubular member connecting said handle member to said filter means, said lifting rod means being freely axially slidably receivable in said tubular member.

3. A coffee maker, comprising: a cylindrical vessel open at its top; removable cover means for closing the top of said vessel; means defining a passage for pouring liquid out of said vessel with said cover means positioned on the top thereof; a first rod member of hollow tubular form extending freely slidably through said cover means and axially of said vessel when said cover means is positioned on top of said vessel; a circular filter unit connected to one end of said first rod member, said filter unit comprising a circular filter element the periphery of which is spring-pressed into yielding engagement with the internal lateral surface of said vessel with said unit positioned for axial movement within said vessel; a second rod member freely longitudinally slidable within said first rod member; and a disc member connected to one end of said second rod member, said disc member being positionable at the bottom of said vessel to substantially cover said bottom, said second rod member extending upwardly at least to the top of said vessel when said disc member is positioned at the bottom thereof.

4. A coffee maker according to claim 3, further comprising handle means connected to the other end of said first rod member.

5. A coffee maker according to claim 3, further comprising a handle member connected to and closing the other end of said first rod member, said second rod member extending outwardly beyond said one end of said first rod member, the other end of said second rod member being spaced from said handle member with said disc member at the bottom of said vessel and said filter unit in its lowermost position within said vessel.

References Cited by the Examiner

UNITED STATES PATENTS

| 187,893 | 2/1877 | Oliver | 99—289 X |
| 1,018,684 | 2/1912 | Smith | 99—317 |
| 2,053,021 | 9/1936 | Cassol | 99—287 |
| 2,211,486 | 8/1940 | Zoia | 99—287 |
| 2,313,761 | 3/1943 | McMenamin | 99—312 |

IRVING BUNEVICH, *Primary Examiner.*

CHARLES A. WILLMUTH, *Examiner.*

S. P. FISHER, *Assistant Examiner.*